J. L. PORTER.
REMAGNETIZING DEVICE.
APPLICATION FILED MAR. 20, 1918.

1,293,912.

Patented Feb. 11, 1919.
2 SHEETS—SHEET 1.

Inventor
James L. Porter

J. L. PORTER.
REMAGNETIZING DEVICE.
APPLICATION FILED MAR. 20, 1918.

1,293,912.

Patented Feb. 11, 1919.
2 SHEETS—SHEET 2.

Inventor
James L. Porter

UNITED STATES PATENT OFFICE.

JAMES L. PORTER, OF LOS ANGELES, CALIFORNIA, ASSIGNOR TO GUSTAVE A. FOEHL, OF PATERSON, NEW JERSEY.

REMAGNETIZING DEVICE.

1,293,912.   Specification of Letters Patent.   Patented Feb. 11, 1919.

Application filed March 25, 1918. Serial No. 223,678.

*To all whom it may concern:*

Be it known that I, JAMES L. PORTER, a citizen of the United States, residing at Los Angeles, in the county of Los Angeles and State of California, have invented a new and useful Improvement in Remagnetizing Devices, of which the following is a specification.

My invention relates to remagnetizing devices for remagnetizing the permanent magnets of a Ford motor wherein a series of electromagnets operate in conjunction with means for transforming an alternating current of 220 volts or of 110 volts into a direct current of sufficient voltage to produce a sufficient amperage to remagnetize the permanent magnets of a Ford magneto; and the objects of my invention are—

First, to provide a remagnetizing device adapted to remagnetize the permanent magnets of a Ford motor vehicle or the like;

Second, to provide an improved device of the character described adapted to operate on alternating or direct currents of various commercial voltages to produce a magnetic induction of sufficient strength to remagnetize the permanent magnets of a Ford motor vehicle or the like; and Third, to provide an improved remagnetizing device adapted to remagnetize the permanent magnets of a Ford motor vehicle without removing said magnets from said vehicle.

I accomplish these several objects by means of the device disclosed in the drawings forming a part of the present specification wherein like characters of reference are used to designate similar parts throughout the said specification and drawings, and in which—

Figures 1, 2:
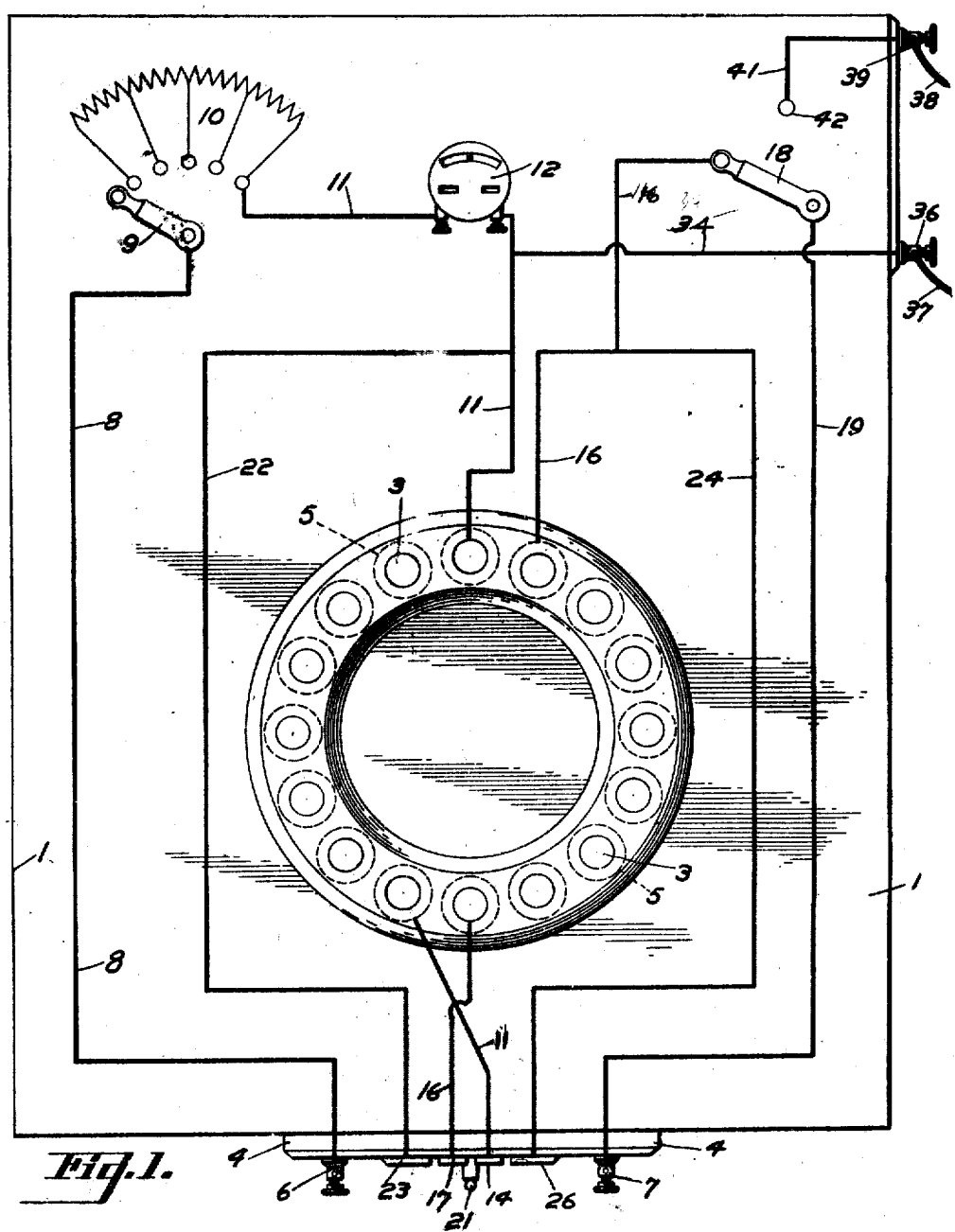
Figure 1 is a plan view of my improved device disclosing the diagram of the circuit therefor.
Fig. 2 is a detailed plan view of a terminal plate by means of which the remagnetizing electromagnets may be connected in series or parallel with the electrical conductor.
Figure 3:
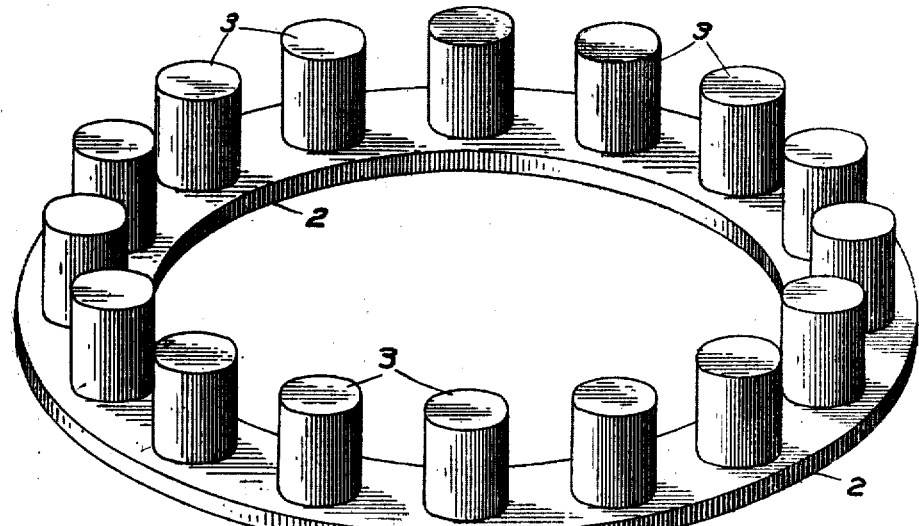
Fig. 3 is a perspective view of the ring and cores formed integral therewith.

Referring to the drawings the numeral 1 is used to designate a suitable box or housing within which is mounted a cast iron ring 2 having a series of vertically disposed parallel cylindrical cores 3 formed integral with the ring 2.

One end of the housing 1 is provided with an insulating plate 4 having mounted thereon binding posts or terminals 6 and 7, the purpose of which will hereinafter be more fully described.

An electric conductor or wire 8 leads from the terminal 6 to the contact arm 9 of a rheostat 10. A wire or conductor 11 conducts an electrical current through an ammeter 12 and from said ammeter 12 the conductor 11 is wound in opposite directions around approximately one-half of the cores 3 on the ring 2, to produce electromagnets of opposite polarity when a current is passed through said conductor 11. The conductor 11 then terminates in a terminal plate 14 on the insulated block 4 on the housing 1.

A conductor 16 leads from an adjacent terminal plate 17 on the block 4 and after being wound in opposite directions around the remaining half of the cores 2, to produce a second series of electromagnets of opposite polarity, said conductor 16 leads to a switch arm 18 and a conductor 19 leads from said arm 18 to the terminal 7 on the block 1.

From the foregoing it will be observed that I have provided a continuous electrical conductor connecting all of the electromagnets in series when the plates 14 and 17 are connected by means of a suitable plug 21.

A shunt wire 22 is connected to the conductor 11 at a point between the ammeter 11 and the cores 3 and leads to a terminal plate 23 on the block 4 and adjacent to the terminal plate 17 of the wire 16.

A second shunt wire 24 is connected to the conductor 16 at a point between the coils 3 and the switch arm 18 and leads to a terminal plate 26 adjacent the terminal plate 14 of the conductor 11 on the block 4.

It will thus be observed from the foregoing that if the plug 21 is removed to break contact or connection between the plates 14 and 17 and other plugs are placed to connect the terminal plate 14 with the plate 16, and the plate 17 with the plate 23, respectively, then a portion of the current only will flow through the conductor 11, one-half of the electromagnets, plates 14 and 26 to the conductor 16 by way of the shunt wire 24 and to the conductor 19 to the terminal 7. The remaining portion of the current will flow through the first mentioned shunt wire 22, terminal plates 23 and 17, and the remaining half of the electromagnets on the conductor 16 and to the conductor 19 through the switch arm 18, thereby connecting the two halves of the electromagnets in parallel with the continuous conductor as represented by the several wires described.

The purpose of this arrangement is to provide a remagnetizing device which may be connected to any circuit of commercial voltage such as an alternating current of either 220 or 110 volts, or to a direct current of 110 volts.

When connected to an alternating current of 220 volts the current first passes through a rectifier to transform the alternating current into a direct current. In passing through the rectifier, not shown, the alternating current of 220 volts produces approximately 18 amperes in the magnetic coils when the cores 3 are wound with 1000 feet of a suitable size wire and all of said cores 3 are connected in series with the conductor, which amperage has been found sufficient for the required purpose.

When connected with a direct current of 110 volts the same results in amperage are obtained without the use of a transformer or rectifier.

When an alternating current of 110 volts is used a direct current is produced, which, with 1000 feet of wire produces only 9 amperes which is insufficient for the required purpose.

To produce 18 amperes with an alternating current of 110 volts transformed into a direct current of 55 volts the current is divided in the manner hereinbefore described thereby cutting down the resistance on each leg or shunt to 500 feet of wire and as the resistance is only one-half the amperage is doubled thereby producing 18 amperes on each half of the electromagnets.

Figure 4:
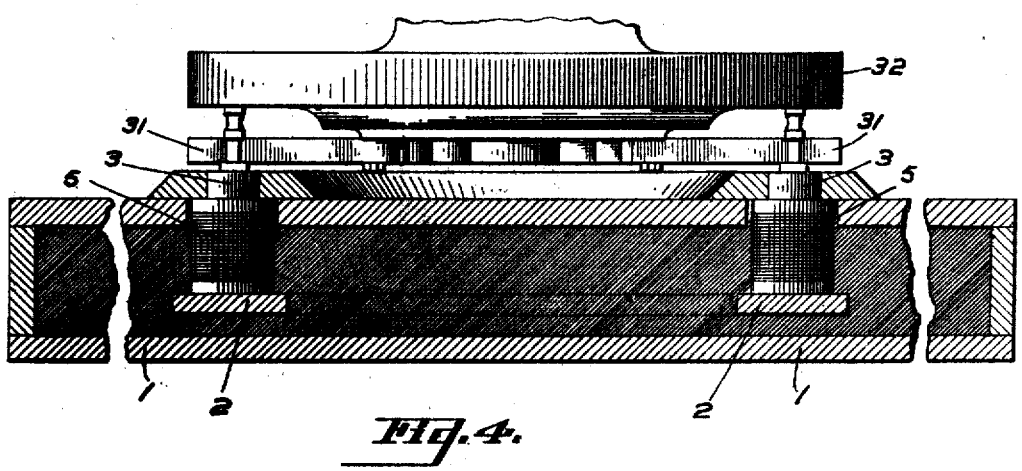
Fig. 4 is a transverse sectional view of Fig. 1.

The permanent magnets 31 of a Ford motor vehicle are secured to the fly-wheel 32. The magnets 31 may be remagnetized by removing the fly-wheel 32 and magnets 31 thereon from the vehicle and placing said magnets 31 in contact with the ends of the cores 3 as disclosed in Fig. 4 of the drawings, with the south poles of the magnets 31 on the north poles of the cores 3.

The contact arm 9 of the rheostat 10 is then moved to gradually permit the full flow of current through the electromagnets to induce a magnetic flux in the cores 3 which magnetic flux in turn remagnetizes the permanent magnets 31 of the Ford vehicle by induction, the ammeter meanwhile indicating the quantity of current flowing through the coils.

To remagnetize the permanent magnets 31 without removing the same from the vehicle I have provided a conductor 34 connected to the conductor 11 at a point between the ammeter 12 and the magnetic coils 5 which conductor 34 leads to a terminal or binding post 36 to which is connected an electrode 37.

A second electrode 38 is connected to a second terminal 39 which has a conductor 41 to a contact 42 arranged to be connected with the switch arm 18.

By moving the switch arm 18 to contact with the contact 42 it is evident that the terminal or conductor 16 will be disconnected from the return wire 19 of the terminal 7 so that no current can flow through the coils 5.

The magnets 31 of the Ford vehicle are rotated, by means of a suitable crank or other tool not shown, until the south poles of said magnets are opposite the north poles of the electromagnets of the magneto of said vehicle.

One of the electrodes 37 or 38 is grounded to the frame of the vehicle and the remaining electrode is placed in contact with one of the terminals of the electromagnets of the magneto in a manner that will send the current through said magnets in an opposite to normal direction.

The arm 9 of the rheostat 10 is then moved to gradually permit the passage of the full strength of the current through the electrodes 37 and 38 until the magnetic flux in the electromagnets of the vehicle magneto induces sufficient magnetism within the permanent magnets. The current is then gradually reduced by means of the rheostat 10 and gradually discontinued.

I find from experiment that it is necessary to gradually increase and decrease the flow of current when charging in the above mentioned manner for the reason that there is a tendency to reverse the current in the electromagnets of the magneto when the full strength of the current is suddenly discontinued which reversal of current will tend to demagnetize the permanent magnets 31.

It is obvious from the foregoing that I have provided an improved remagnetizing device wherein the permanent magnets of a Ford motor vehicle may be remagnetized either within or apart from the said vehicle.

It is also evident that I have provided a remagnetizing device adapted to produce sufficient amperage from alternating currents of 220 or 110 volts as well as from a direct current of 110 volts.

Having thus described my invention what I claim as new and desire to secure by Letters Patent is—

1. A remagnetizing device comprising a box; a ring mounted within the box and having an equal number of parallel cores formed integral therewith; an electrical conductor wound in opposite directions on adjacent cores to produce electromagnets of opposite polarity and connecting each half of the total number of magnets so produced in series; shunt wires connected to the electrical conductor; means for connecting the shunt wires with each half of the magnets to connect each half in parallel with the conductor; and means for graduating and controlling the quantity of current flowing through the magnets.

2. A remagnetizing device comprising a box; a ring mounted within the box and having an equal number of parallel cores formed integral therewith; an electrical conductor wound in opposite directions on adjacent cores to produce electromagnets of opposite polarity and connecting each half of the total number of magnets so produced in series; shunt wires connected to the electrical conductor; means for connecting the shunt wires with each half of the magnets to connect each half in parallel with the conductor; and means for graduating and controlling the quantity of current flowing through the magnets; a pair of conductors; and means for disconnecting the magnets from the conductors and for connecting the pair of conductors with the first mentioned conductor.

In witnesses whereof I hereunto set my signature.

JAMES L. PORTER.